United States Patent
Kita et al.

(10) Patent No.: US 8,237,812 B2
(45) Date of Patent: Aug. 7, 2012

(54) IMAGING APPARATUS, IMAGING CONTROL METHOD, AND IMAGING CONTROL PROGRAM

(75) Inventors: Mitsuaki Kita, Kanagawa (JP); Nobuyuki Sato, Tokyo (JP); Masashi Wakatsuki, Hyogo (JP); Shinya Ishibashi, Osaka (JP); Jun Minakuti, Osaka (JP); Takahiro Koyama, Osaka (JP)

(73) Assignee: Sony Corporation, Tokyo (JP)

( * ) Notice: Subject to any disclaimer, the term of this patent is extended or adjusted under 35 U.S.C. 154(b) by 186 days.

(21) Appl. No.: 12/664,412

(22) PCT Filed: Jun. 5, 2008

(86) PCT No.: PCT/JP2008/060723
§ 371 (c)(1),
(2), (4) Date: Jan. 14, 2010

(87) PCT Pub. No.: WO2008/153085
PCT Pub. Date: Dec. 18, 2008

(65) Prior Publication Data
US 2010/0182451 A1    Jul. 22, 2010

(30) Foreign Application Priority Data
Jun. 14, 2007  (JP) .................. 2007-157183

(51) Int. Cl.
H04N 5/235 (2006.01)
H04N 3/14 (2006.01)
H04N 5/335 (2011.01)
G03B 7/00 (2006.01)

(52) U.S. Cl. .................. 348/229.1; 348/230.1; 348/362; 348/297

(58) Field of Classification Search .... 348/229.1–230.1, 348/362, 222.1, 297–298
See application file for complete search history.

(56) References Cited

U.S. PATENT DOCUMENTS
5,729,288 A    3/1998  Saito
(Continued)

FOREIGN PATENT DOCUMENTS
EP    1 156 673 A2    11/2001
(Continued)

OTHER PUBLICATIONS
Supplementary Search Report issued on Feb. 4, 2011, in European Patent Application No. 08765494.3-2202/2157784.
(Continued)

*Primary Examiner* — Aung S Moe
*Assistant Examiner* — Pritham Prabhakher
(74) *Attorney, Agent, or Firm* — Oblon, Spivak, McClelland, Maier & Neustadt, L.L.P.

(57) ABSTRACT

Imaging signal obtained through exposure for divided exposure times is A/D converted to digital imaging signal. Dark current component is subtracted from the digital imaging signal. The result of subtraction is accumulated and stored in a first memory. Next, exposure for divided exposure times is performed with the imaging device shielded from light. The obtained imaging signal is A/D converted to digital imaging signal. Dark current component is subtracted from the digital imaging signal. The result of subtraction is accumulated and stored sequentially in a second memory. The digital imaging signal stored in the second memory is subtracted from the digital imaging signal stored in the first memory. Then the result of subtraction is output. The word length allocated to one pixel in the first and second memories is longer than the word length of one A/D converted pixel.

8 Claims, 13 Drawing Sheets

U.S. PATENT DOCUMENTS

| | | | |
|---|---|---|---|
| 5,812,703 A * | 9/1998 | Juen et al. | 382/274 |
| 7,167,267 B2 * | 1/2007 | Robins et al. | 358/1.16 |
| 7,274,392 B2 | 9/2007 | Wakabayashi et al. | |
| 7,554,585 B2 * | 6/2009 | Masuyama | 348/243 |
| 7,782,379 B2 * | 8/2010 | Sato | 348/243 |
| 2002/0008766 A1 * | 1/2002 | Tariki | 348/243 |
| 2002/0085112 A1 * | 7/2002 | Hiramatsu et al. | 348/362 |
| 2005/0046713 A1 | 3/2005 | Kato | |
| 2005/0253935 A1 * | 11/2005 | Hiramatsu et al. | 348/222.1 |

FOREIGN PATENT DOCUMENTS

| | | | |
|---|---|---|---|
| EP | 11566732 | * | 11/2001 |
| JP | 1 103375 | | 4/1989 |
| JP | 5 236422 | | 9/1993 |
| JP | 5 268532 | | 10/1993 |
| JP | 8 51571 | | 2/1996 |
| JP | 2001 326850 | | 11/2001 |
| JP | 2003 116064 | | 4/2003 |
| JP | 2003 219282 | | 7/2003 |
| JP | 2005 79948 | | 3/2005 |
| JP | 2005 191641 | | 7/2005 |
| JP | 2006 108950 | | 4/2006 |

OTHER PUBLICATIONS

U.S. Appl. No. 12/533,615, filed Jul. 31, 2009, Ukita, et al.

* cited by examiner

Figures 1A, 1B, 1C:
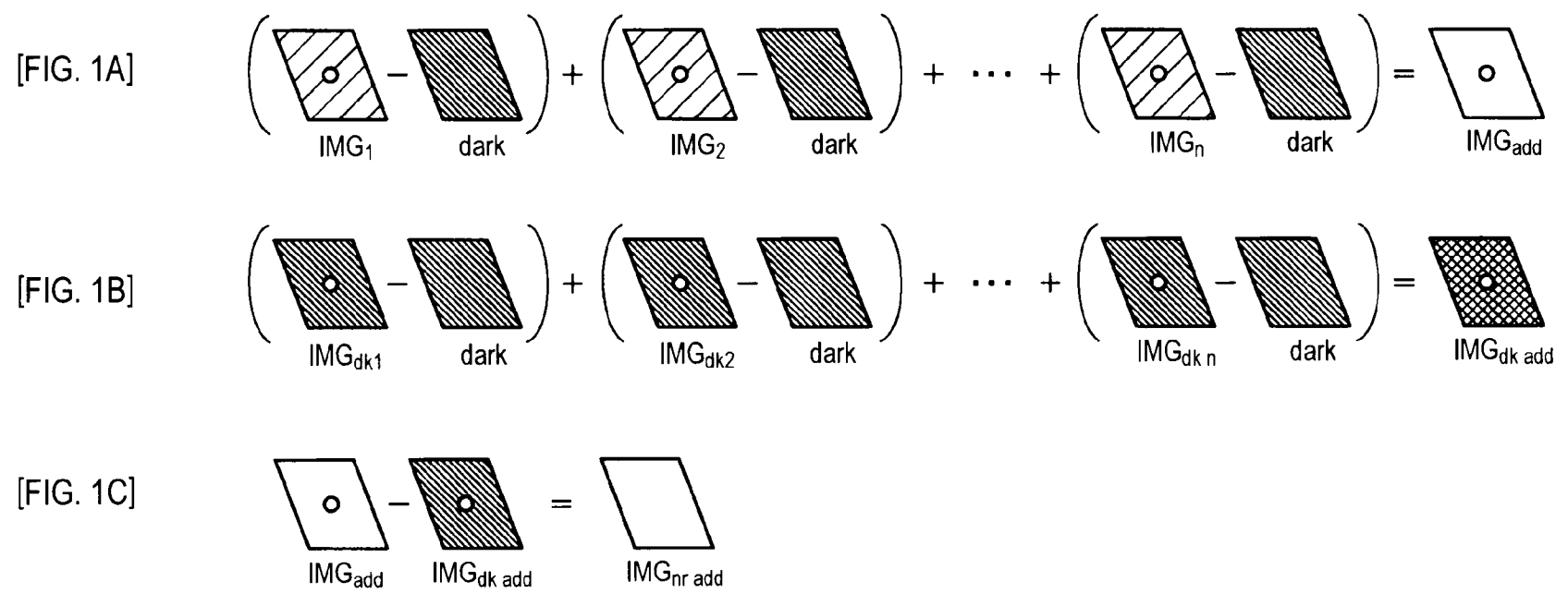

[FIG. 1A] $(IMG_1 - dark) + (IMG_2 - dark) + \cdots + (IMG_n - dark) = IMG_{add}$

[FIG. 1B] $(IMG_{dk1} - dark) + (IMG_{dk2} - dark) + \cdots + (IMG_{dk\,n} - dark) = IMG_{dk\,add}$

[FIG. 1C] $IMG_{add} - IMG_{dk\,add} = IMG_{nr\,add}$

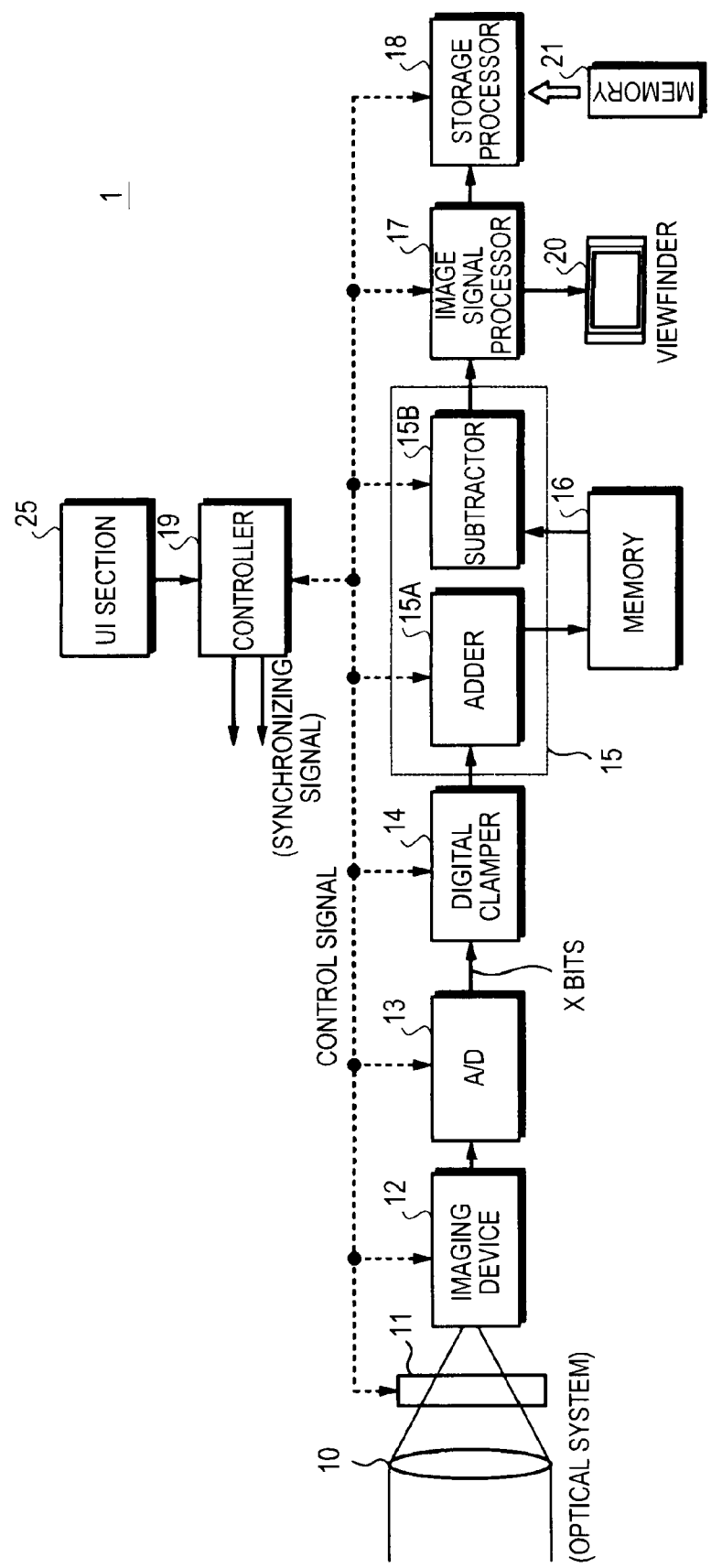

[FIG. 3]
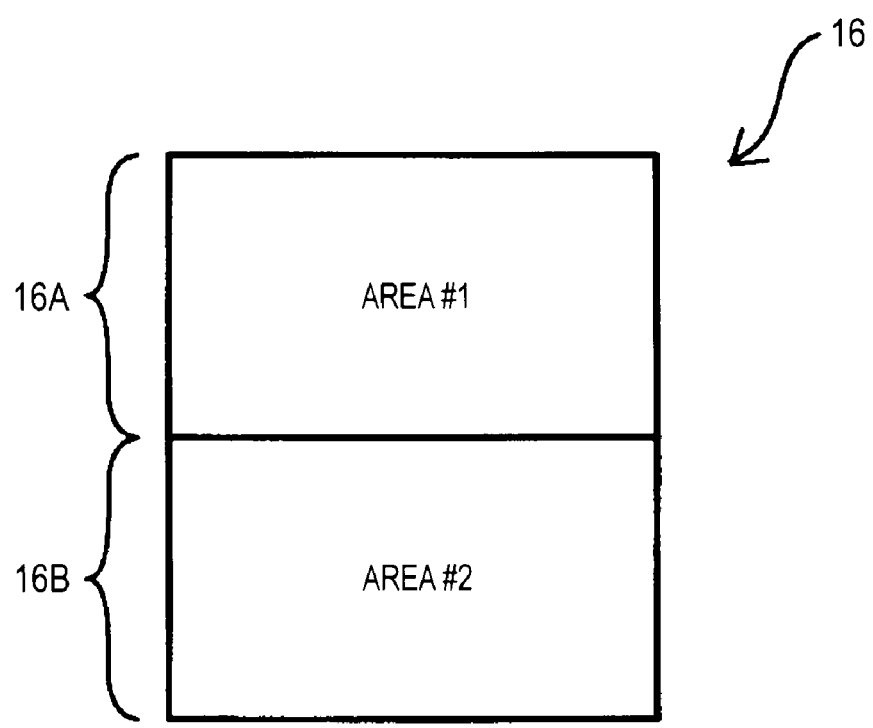

[FIG. 4]
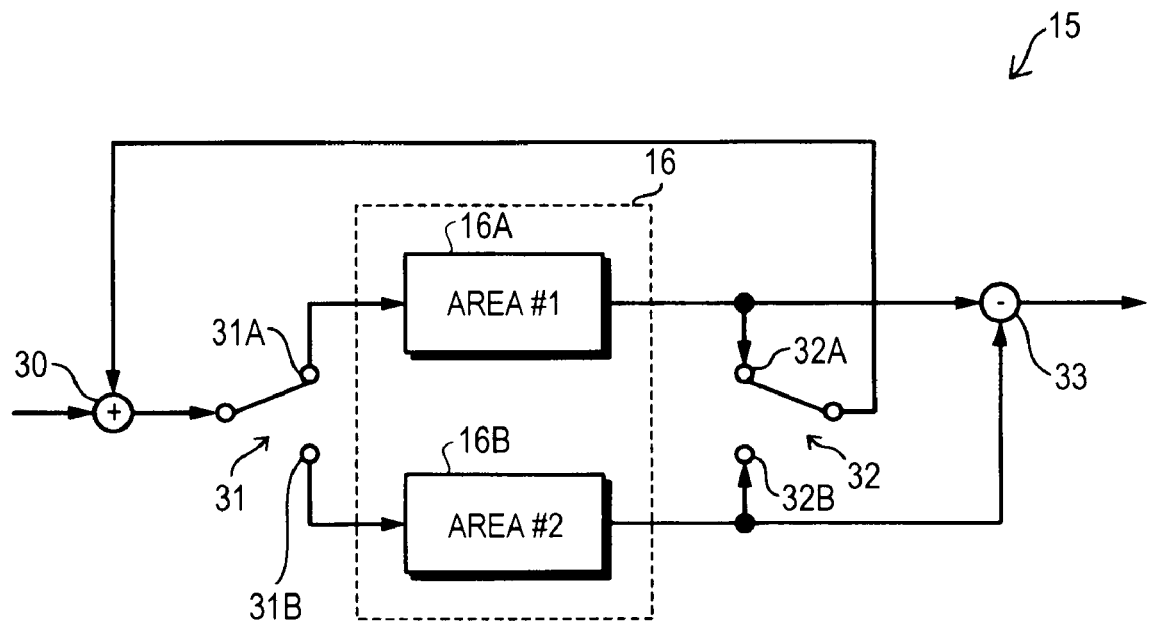

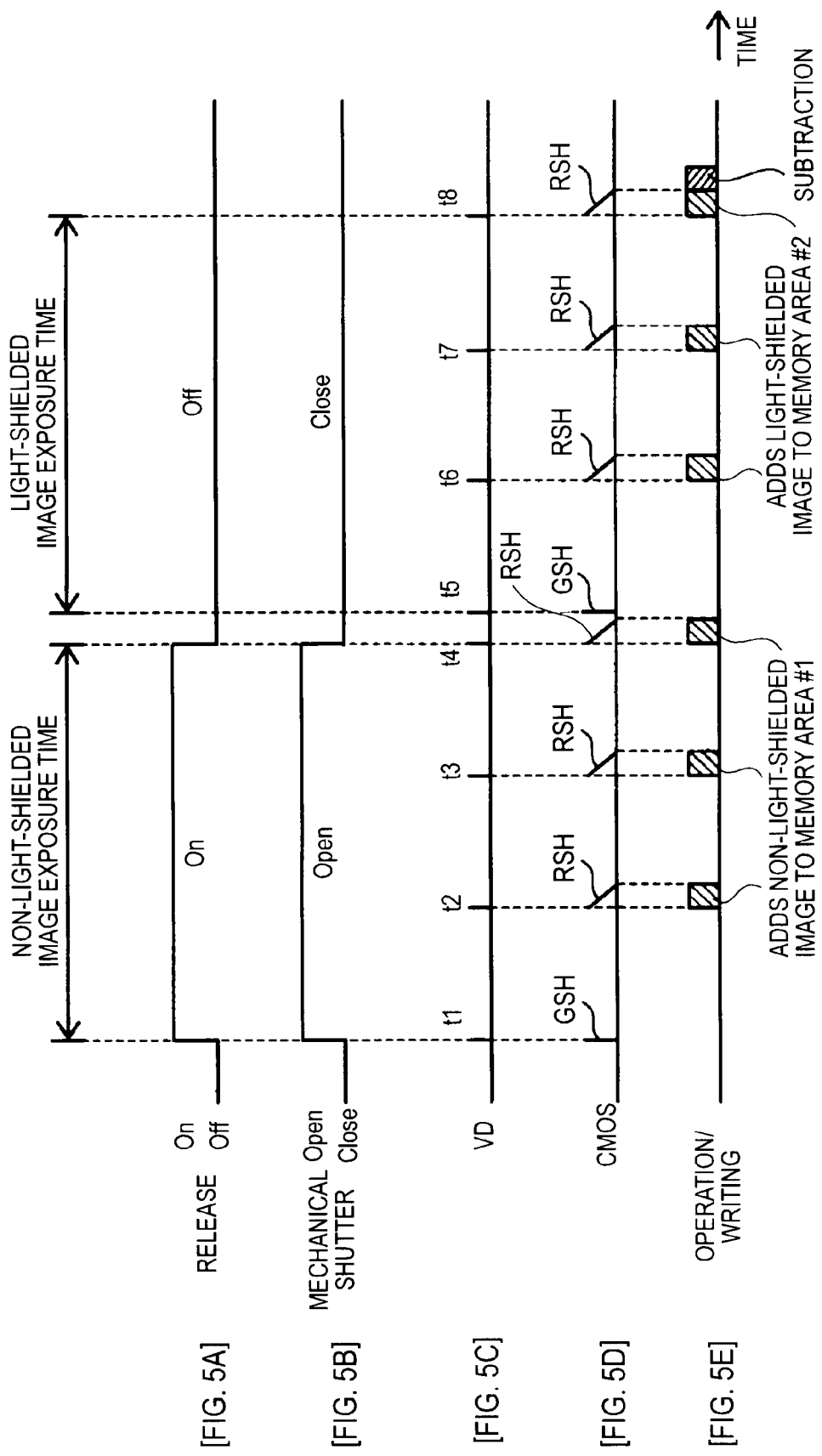

[FIG. 6]
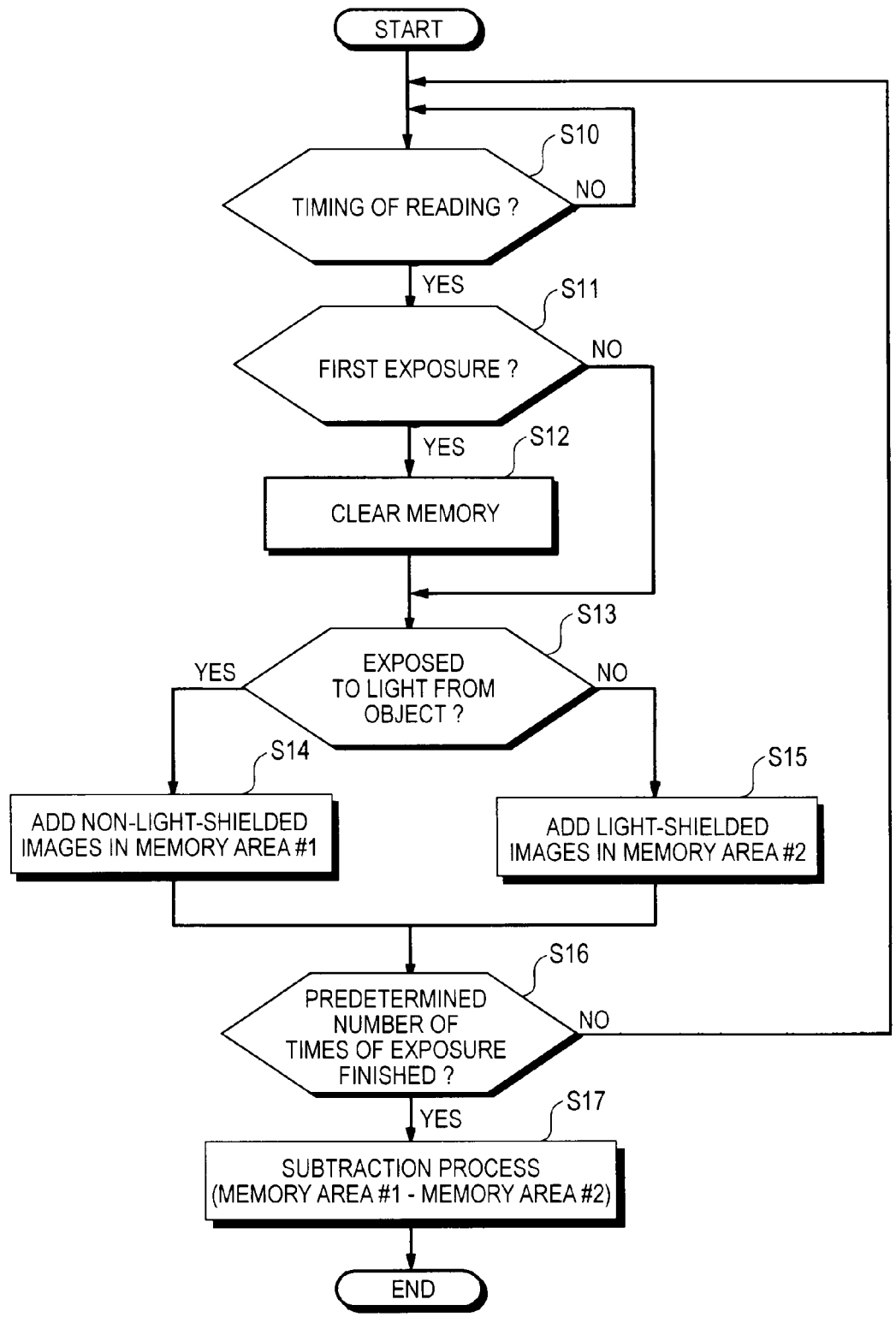

[FIG. 7A]
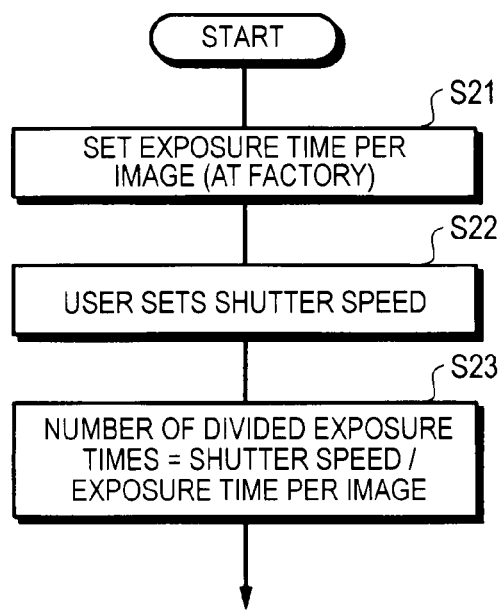
[FIG. 7B]
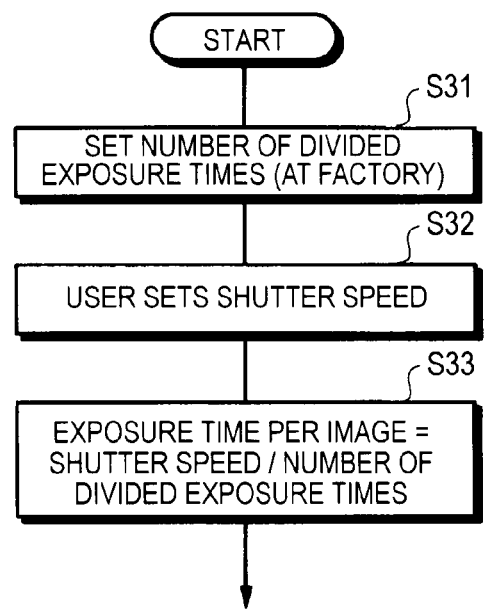

[FIG. 8]
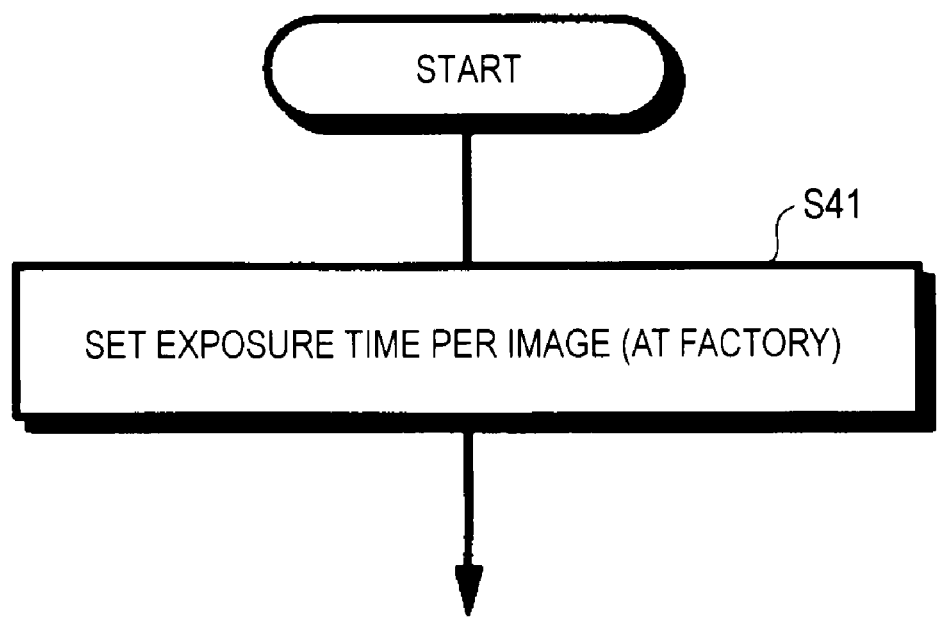

[FIG. 9A]
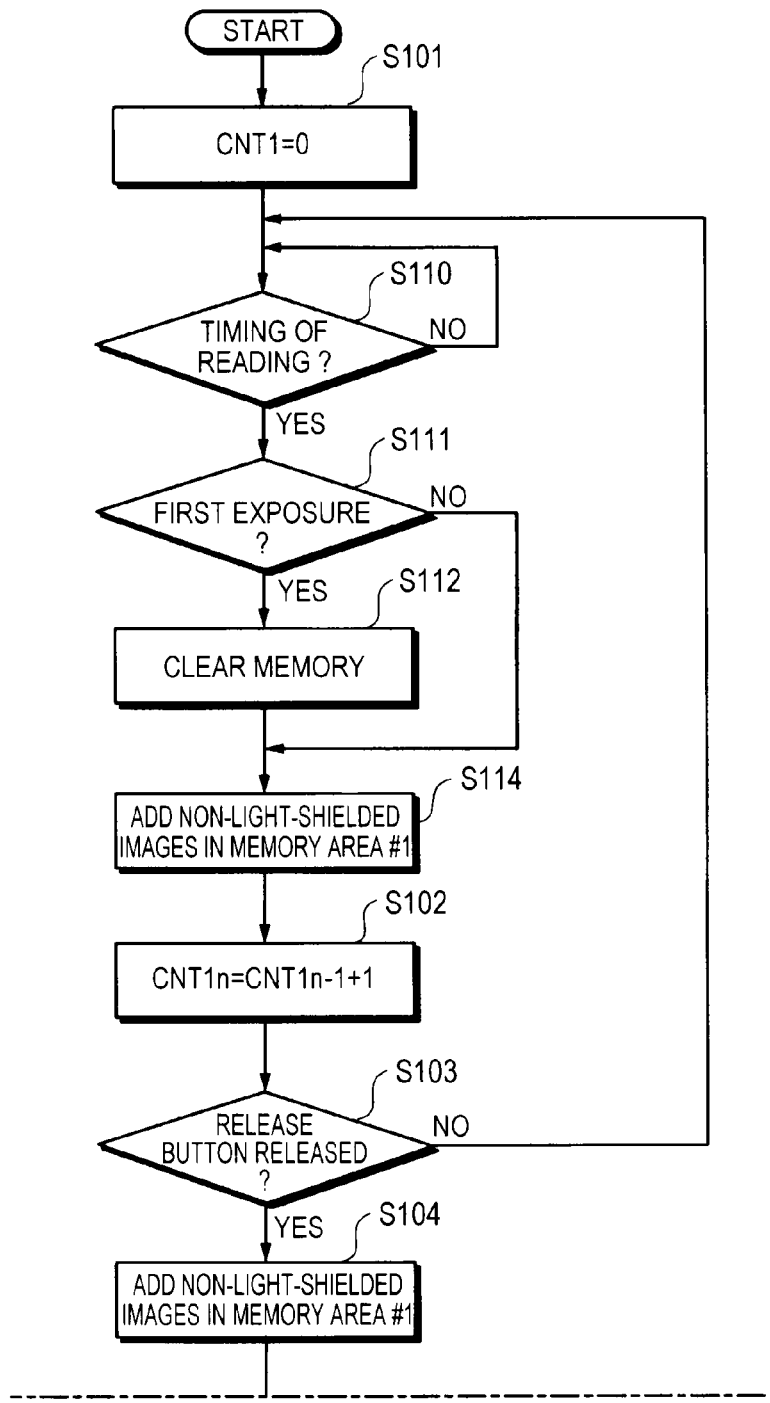

[FIG. 9B]
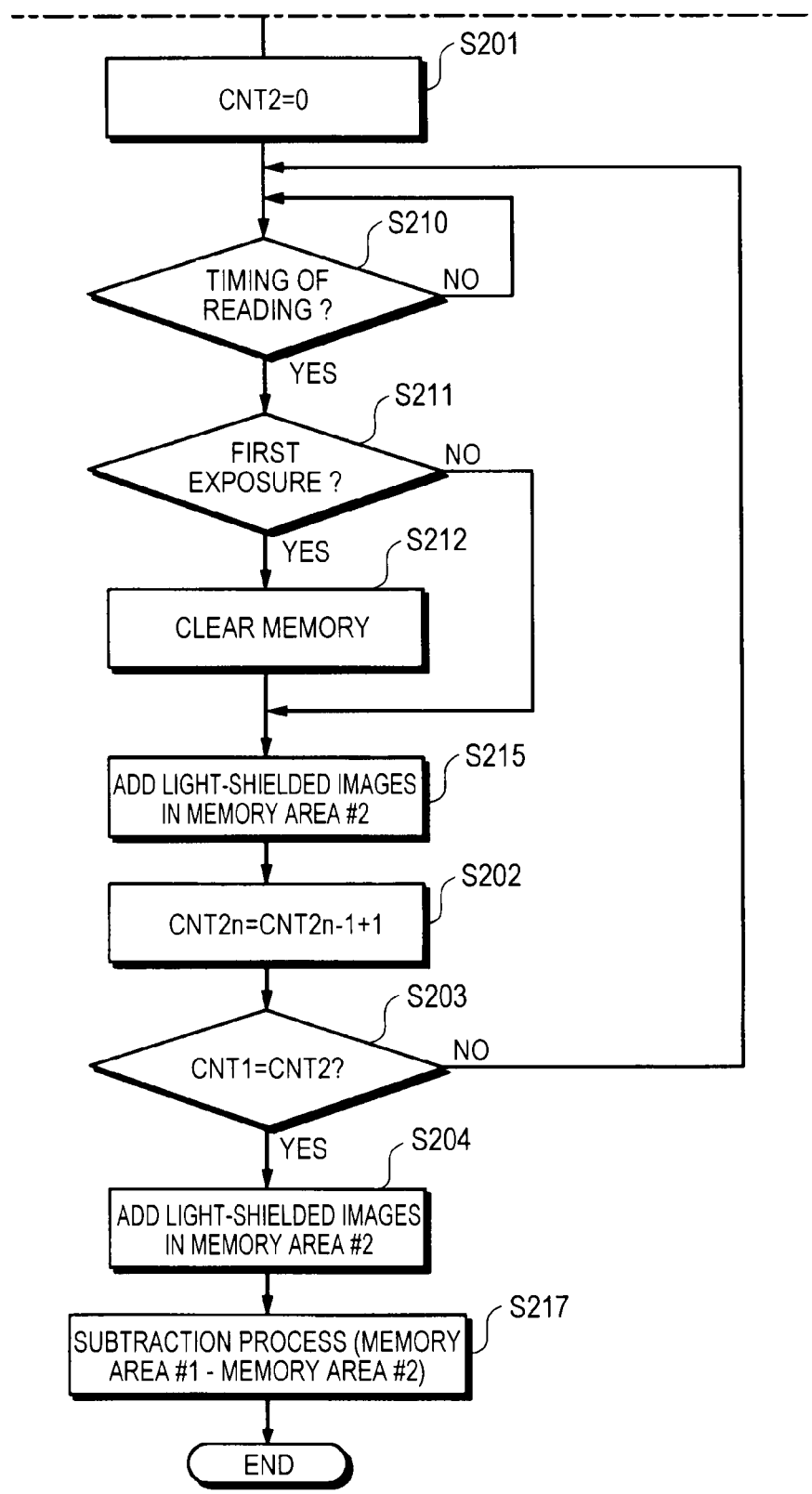

[FIG. 10A]
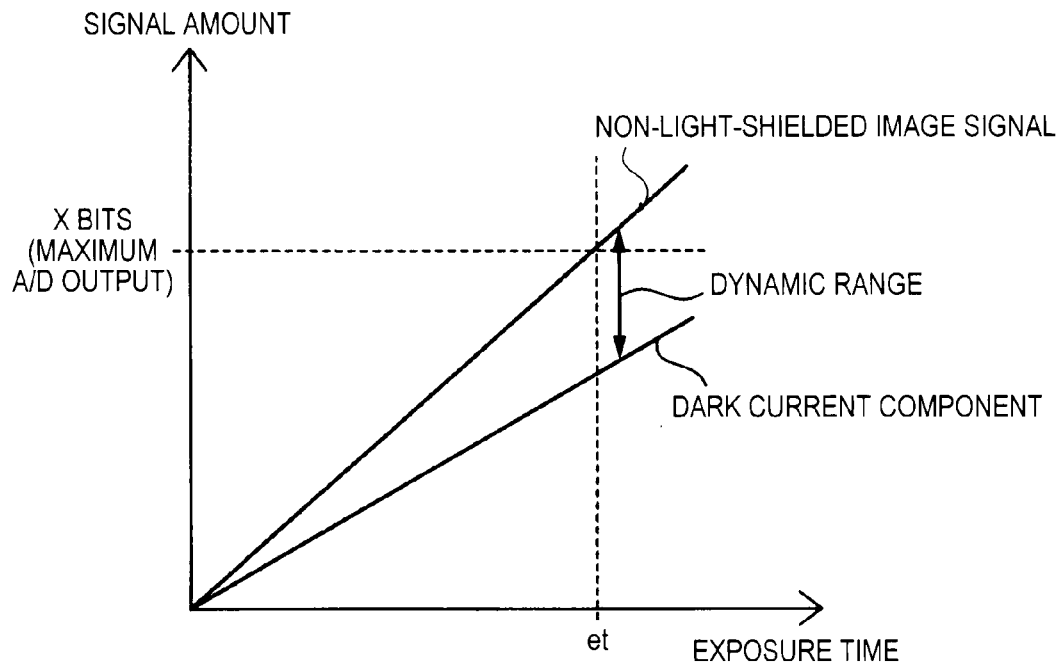
[FIG. 10B]
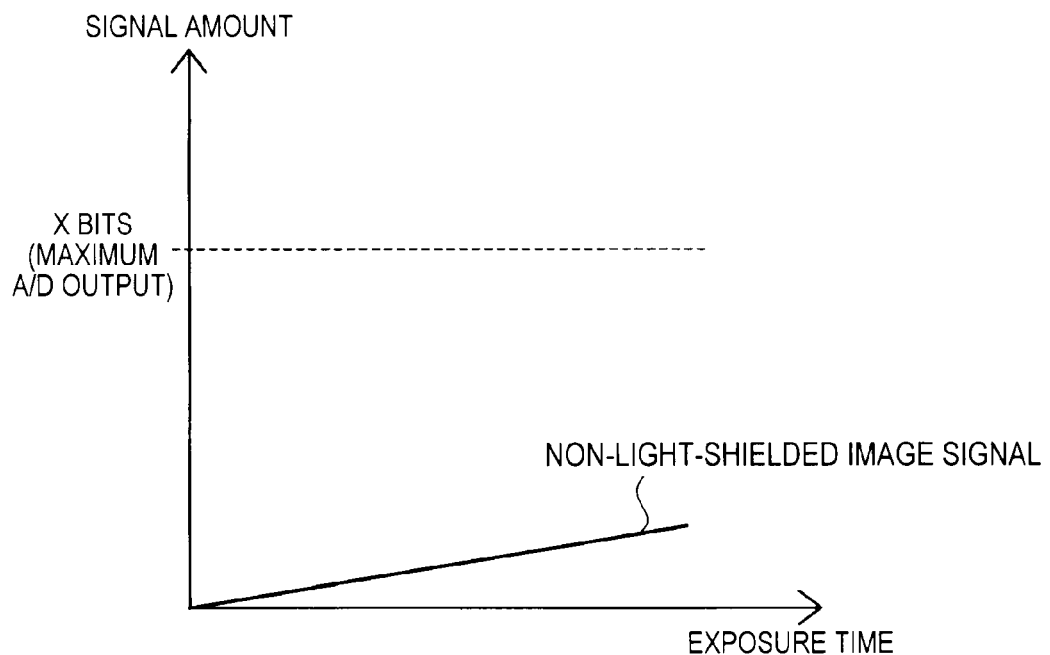

[FIG. 11A]
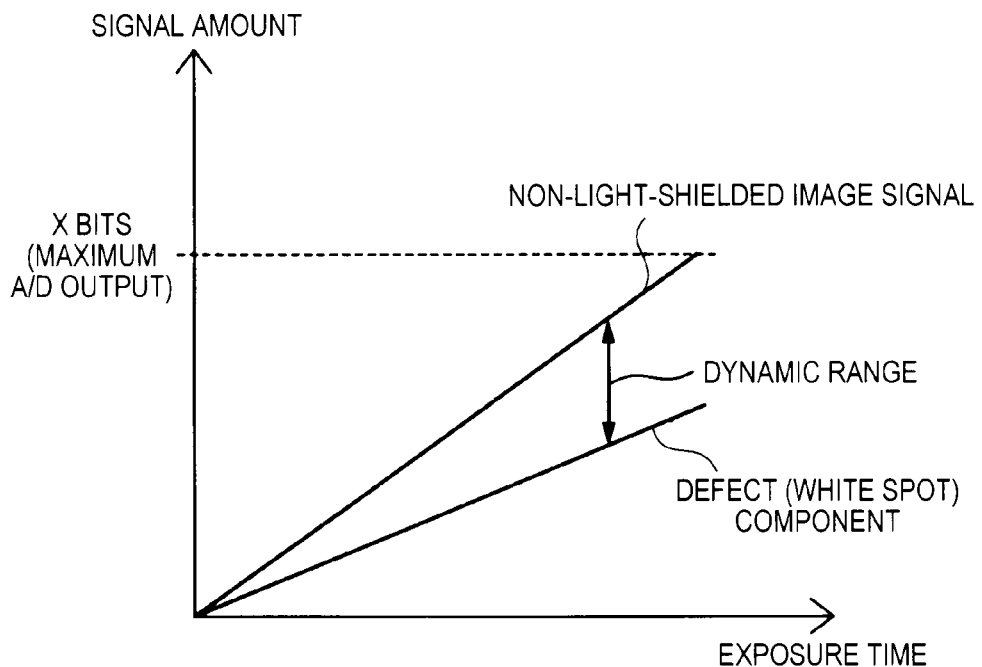
[FIG. 11B]
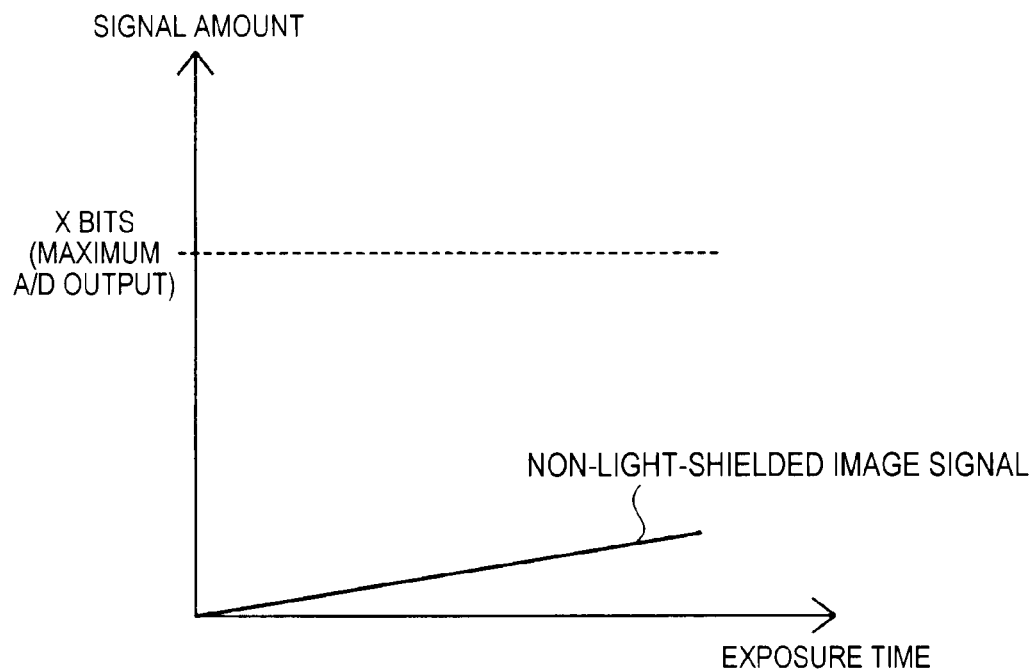

[FIG. 12A]
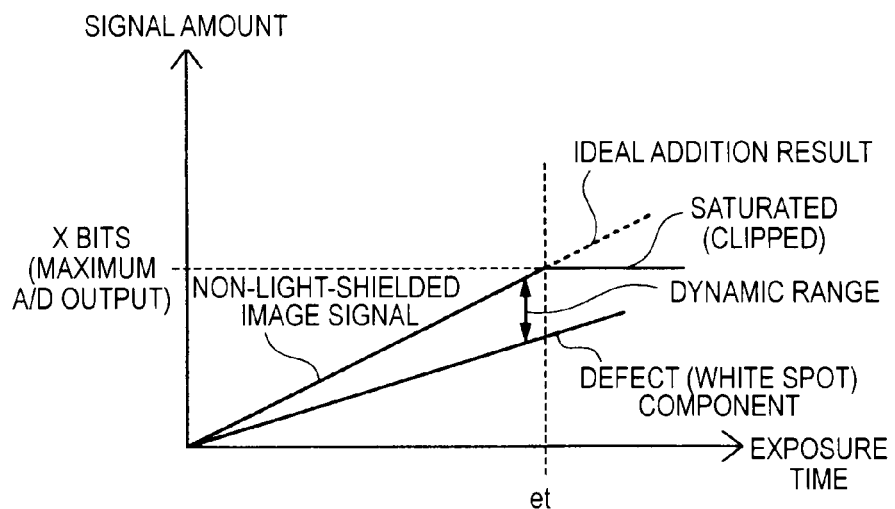
[FIG. 12B]
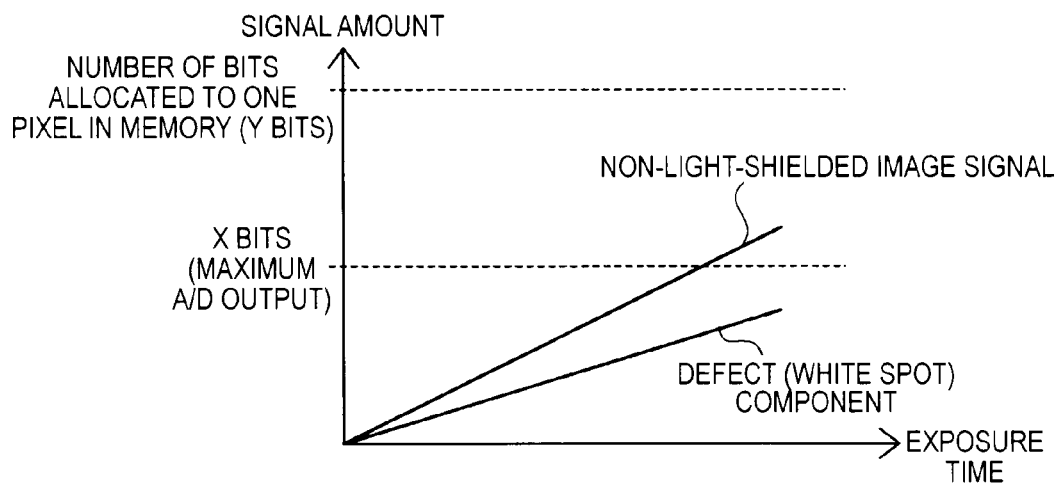
[FIG. 12C]
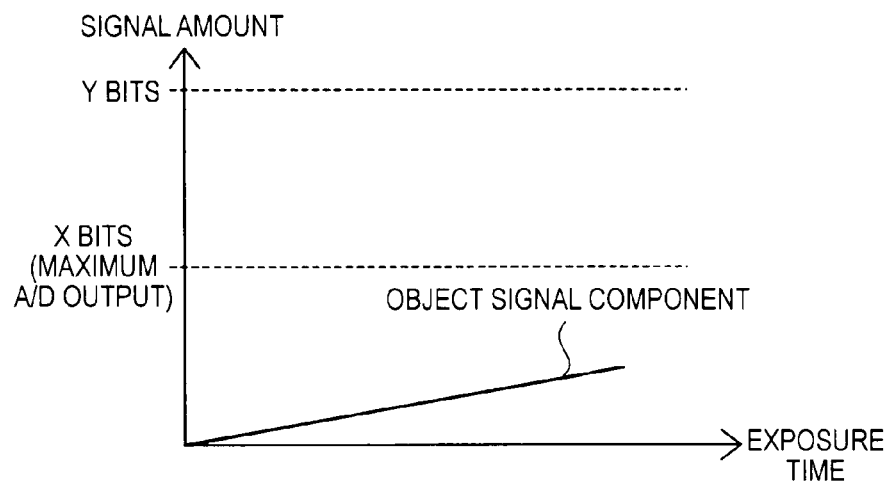

IMAGING APPARATUS, IMAGING CONTROL METHOD, AND IMAGING CONTROL PROGRAM

TECHNICAL FIELD

The present invention relates to an imaging apparatus, imaging control method, and imaging control program suitable for long exposure imaging using an imaging device.

BACKGROUND ART

When imaging is performed with a film or imaging device of an imaging apparatus irradiated with a small amount of light per unit time, the imaging device or film needs to be irradiated with more amount of light by setting a long exposure time such as several tens of seconds, several minutes or longer. Examples of performing such imaging may include performing imaging in the dark, performing imaging on a dark object such as a star, and performing precise imaging with narrow aperture and deep depth of field.

In imaging devices, such as CCD (charge coupled device) or CMOS (complementary metal-oxide semiconductor) imager, that convert irradiated light to electric signal by photoelectric conversion to output, imaging signals output with a predetermined period (such as frame rate) are added for each pixel to increase dynamic range. JP-A-5-236422 describes a configuration for accumulating image signals obtained from an imaging device for each frame to increase dynamic range.

Under imaging conditions such as long exposure, increase in the number of white spots in the dark and increase in the signal level due to a fixed pattern of the imaging device may occur, which may cause image data obtained through imaging to be very noisy and visually undesirable. This is because of the following reasons. A white spot caused by leak current occurring in a pixel section of the imaging device (hereinafter referred to as white spot) is due to a fixed pattern specific to the imaging device. The signal level of the white spot increases in proportion to exposure time. Accordingly, the signal level of the white spot, which would be around black signal level by short exposure, may become visible-signal level by long exposure, then causing exponential increase in the number of visible white spots in the dark.

When the signal level of a white spot caused by leak current is increased, by addition, to a level that exceeds memory word length, the information of the pixel with the white spot is clipped at the upper limit of dynamic range, which becomes a defect. When the number of white spots in a screen is sufficiently small, this problem can be solved by performing interpolation using adjacent pixel signals.

However, as described above, long exposure may cause many white spots, in which one white spot is likely adjacent to another white spot and then the interpolation using adjacent pixels may not improve image quality. This requires canceling white spots while increasing dynamic range by adding imaging signals.

One conventional method for solving this problem cancels white spots using image signal obtained by performing imaging with an imaging device shielded from light. For example, first, imaging is performed with the imaging device irradiated with light from an object, then imaging is performed for the same exposure time with the imaging device shielded from light, and then the image signal obtained with the imaging device shielded from light (hereinafter referred to as "light-shielded image signal") is subtracted from the image signal obtained with the imaging device irradiated with light (hereinafter referred to as "non-light-shielded image signal") for each pixel. This method can cancel white spots, because, in light-shielded image signal, the white-spot signal level of a white-spot pixel increases according to exposure time, while the signal level of non-white-spot pixels are ideally black signal level.

JP-A-2003-219282 and JP-A-8-51571 describe techniques of removing a fixed pattern noise specific to a given imaging device by subtracting light-shielded image signal from non-light-shielded image signal for each pixel, as described above. In addition, according to JP-A-8-51571, white spots are more appropriately removed by reducing the level of light-shielded image signal to 1/N and repeating the subtraction of the 1/N reduced light-shielded image signal from non-light-shielded image signal N times.

DISCLOSURE OF THE INVENTION

Problems to be Solved by the Invention

However, one problem is that, in canceling white spots by subtracting light-shielded image signal from non-light-shielded image signal, when very long exposure is performed, non-light-shielded image signal and light-shielded image signal based on the charge accumulated through long exposure may reach saturation level, and thereby the dynamic range of the signal at white-spot signal level in the non-light-shielded image signal and the light-shielded image signal may significantly decrease.

Another problem is that, when extremely long exposure is performed, the accumulation of dark current becomes non-negligible. Specifically, when exposure is performed for an extremely long time, even charge due to accumulated dark current alone may cause the output signal of the imaging device to reach saturation level.

In view of the above, an object of the present invention is to provide an imaging apparatus, imaging control method, and imaging control program that can effectively remove white spots while maintaining sufficient dynamic range of an object signal.

Means for Solving the Problems

To solve the above-described problems, the invention provides an imaging apparatus including:

an imaging device for having a plurality of pixels, storing charge generated by photoelectric conversion in each pixel, and outputting imaging signal including pixel data based on charge stored in each pixel;

a first and second memories for storing the imaging signal;

an adder for adding the imaging signal for each pixel data;

a controller for, in non-light-shielded condition, causing the imaging device to output the imaging signal for every divided exposure time into which exposure time is divided by a number of division times, and accumulating, for each pixel data, the imaging signal for each divided exposure time and storing the accumulated imaging signal in the first memory, and for, in light-shielded condition, causing the imaging device to output the imaging signal for every divided exposure time into which the exposure time is divided by the number of division times, and accumulating, for each pixel data, the imaging signal for each divided exposure time and storing the accumulated imaging signal in the second memory; and a subtractor for subtracting each pixel data stored in the second memory and accumulated the number of division times from each pixel data stored in the first memory and accumulated the number of division times.

The invention provides an imaging control method for performing imaging using an imaging device for having a plurality of pixels, storing charge generated by photoelectric conversion in each pixel, and outputting imaging signal including pixel data based on charge stored in each pixel, the method including the steps of:

performing imaging by causing the imaging device to output the imaging signal;

in non-light-shielded condition, causing the imaging device to output the imaging signal as non-light-shielded image signal for every divided exposure time into which exposure time is divided by a number of division times;

accumulating, for each pixel data, the non-light-shielded image signal for each divided exposure time;

in light-shielded condition, causing the imaging device to output the imaging signal as light-shielded image signal for every divided exposure time into which the exposure time is divided by the number of division times;

accumulating, for each pixel data, the light-shielded image signal for each divided exposure time; and subtracting each pixel data accumulated the number of division times in the non-light-shielded condition from each pixel data accumulated the number of division times in the light-shielded condition.

The invention provides an imaging control program for causing a computer to execute an imaging method for performing imaging using an imaging device for having a plurality of pixels, storing charge generated by photoelectric conversion in each pixel, and outputting imaging signal including pixel data based on charge stored in each pixel, the imaging method including the steps of:

performing imaging by causing the imaging device to output the imaging signal;

in non-light-shielded condition, causing the imaging device to output the imaging signal as non-light-shielded image signal for every divided exposure time into which exposure time is divided by a number of division times;

accumulating, for each pixel data, the non-light-shielded image signal for each divided exposure time;

in light-shielded condition, causing the imaging device to output the imaging signal as light-shielded image signal for every divided exposure time into which the exposure time is divided by the number of division times;

accumulating, for each pixel data, the light-shielded image signal for each divided exposure time; and subtracting each pixel data accumulated the number of division times in the non-light-shielded condition from each pixel data accumulated the number of division times in the light-shielded condition.

ADVANTAGE OF THE INVENTION

As described above, according to the invention, charges are read from an imaging device in non-light-shielded condition at each timing of dividing exposure time, then component corresponding to dark current component is removed from the imaging signal based on the read charges, then the digital imaging signal with the dark current component removed is accumulated sequentially for every reading and stored in a first memory, then, when exposure time ends, data corresponding to charges stored in the imaging device in light-shielded condition during the period of time corresponding to the exposure time is subtracted from the digital imaging signal stored in the first memory, and then the result of subtraction is output. This provides an advantage of preventing the data of accumulated digital imaging signal in the first memory from being clipped and ensuring the dynamic range.

BRIEF DESCRIPTION OF THE DRAWINGS

FIG. 1 is a schematic drawing for conceptually explaining an embodiment of the present invention.

FIG. 2 is a block diagram showing an example of configuration of an imaging apparatus in accordance with the embodiment of the invention.

FIG. 3 is a schematic drawing showing an example of configuration of a memory.

FIG. 4 is a block diagram showing an example of configuration of an adder/subtractor.

FIG. 5 is a timing chart showing an example of imaging operation of the imaging apparatus.

FIG. 6 is a flowchart showing an process in accordance with the embodiment of the invention.

FIG. 7 shows flowcharts of a process of determining the number of divided exposure times and a process of determining exposure time per image in accordance with the embodiment of the invention.

FIG. 8 shows a flowchart of a process of determining the number of divided exposure times and exposure time per image in accordance with the embodiment of the invention.

FIG. 9 shows flowcharts of another example of the process in accordance with the embodiment of the invention.

FIG. 10 shows schematic drawings for explaining an example of an advantage of the control in accordance with the embodiment of the invention.

FIG. 11 shows schematic drawings for explaining an example of an advantage of the control in accordance with the embodiment of the invention.

FIG. 12 shows schematic drawings for explaining an example of an advantage of the control in accordance with the embodiment of the invention.

DESCRIPTION OF REFERENCE NUMERALS AND SIGNS 1 imaging apparatus
12 imaging device
13 A/D converter
14 digital clamper
15 adder/subtractor
16 memory
19 controller

BEST MODE FOR CARRYING OUT THE INVENTION

An embodiment of the invention is described below with reference to the drawings. FIG. 1 conceptually shows an exposure process in accordance with the invention. In the embodiment of the invention, first, with an imaging device irradiated with light from an object, the imaging device is exposed for divided exposure times (time-division exposure), then non-light-shielded image signals obtained through the time-division exposure are accumulated (see FIG. 1A). Next, with the imaging device shielded from light, the imaging device is exposed for divided exposure times (time-division exposure) in the same way, then light-shielded image signals obtained through the time-division exposure with the imaging device shielded from light are accumulated (see FIG. 1B). Finally, the imaging signal is obtained by subtracting the accumulated light-shielded image signal from the accumulated non-light-shielded image signal (see FIG. 1C).

Also, in the embodiment of the invention, signal component "dark" due to dark current of the imaging device is subtracted, by digital clamping, from the non-light-shielded image signal and the light-shielded image signal obtained through exposure, for each exposure of the time-division exposure, as shown in FIGS. 1A and 1B, respectively, then the non-light-shielded image signals from each of which the signal component "dark" due to dark current (hereinafter referred to as dark current component "dark") is subtracted and the light-shielded image signals from each of which the dark current component "dark" is subtracted are accumulated, respectively.

Specifically, in the non-light-shielded condition in which the imaging device is irradiated with light from the object, as illustrated in FIG. 1A, the dark current component "dark" is subtracted from each of a non-light-shielded image signal $IMG_1$ obtained through the first exposure, a non-light-shielded image signal $IMG_2$ obtained through the second exposure, . . . , and a non-light-shielded image signal $IMG_n$ obtained through the n-th exposure, which is the last exposure in the non-light-shielded condition, and then these non-light-shielded image signals from each of which the dark current component "dark" is subtracted are added for each pixel to obtain an added non-light-shielded image signal $IMG_{add}$. This can be expressed by Equation (1) below: Note that $IMG_i$ in Equation (1) is a non-light-shielded image signal obtained by exposing the imaging device for exposure time t. Also note that the dark current component "dark" is to be canceled by clamping and includes a component that varies depending on the temperature.

$$IMGadd = \sum_{i=1}^{n} (IMG_i - \text{dark}) \quad (1)$$

Similarly, in the light-shielded condition in which the imaging device is shielded from light, as illustrated in FIG. 1B, the dark current component "dark" is subtracted, by digital clamping, from each of a light-shielded image signal $IMGdk_1$ obtained through the first exposure, a light-shielded image signal $IMGdk_2$ obtained through the second exposure, . . . , and a light-shielded image signal $IMGdk_n$ obtained through n-th exposure, which is the last exposure in the non-light-shielded condition, and then these light-shielded image signals from each of which the dark current component "dark" is subtracted are added for each pixel to obtain an added light-shielded image signal $IMGdk_{add}$. This can be expressed by Equation (2) below: Note that $IMGdk_i$ in Equation (2) is a light-shielded image signal obtained by exposing the imaging device for exposure time t.

$$IMGdkadd = \sum_{i=1}^{n} (IMGdk_i - \text{dark}) \quad (2)$$

When the period of the light-shielded condition is finished, the added light-shielded image signal $IMGdk_{add}$ is subtracted from the added non-light-shielded image signal $IMG_{add}$ for each pixel, as expressed by Equation (3) below. This gives a final imaging signal $IMGnr_{add}$ (see FIG. 1C). The imaging signal $IMGnr_{add}$ allows wide dynamic range, because white spots due to a fixed pattern and even the effect of dark current are removed from the non-light-shielded image signal.

$$IMGnr = IMGadd - IMGdkadd \quad (3)$$

If these non-light-shielded image signals and light-shielded image signals are digital data, a memory is used for accumulating them. For example, for the non-light-shielded image signals, when a first non-light-shielded image signal obtained through the first exposure is written to the memory and a second non-light-shielded image signal is obtained through the second exposure, the first non-light-shielded image signal is read from the memory, then the second non-light-shielded image signal is added to the first non-light-shielded image signal, and then the result of addition is overwritten to the memory.

In the embodiment, the number of bits allocated to one pixel in the memory and the number of bits used for an operation of one pixel performed by an adder that performs addition of non-light-shielded image signals or light-shielded image signals are set to be more than the quantization bit rate used for A/D (analog to digital) conversion of one pixel data performed by an A/D converter in A/D converting the output of the imaging device. This can reduce clipping and rounding error when adding non-light-shielded image signals or light-shielded image signals, thus improving image quality.

FIG. 2 shows an example of configuration of an imaging apparatus 1 in accordance with the embodiment of the invention. In the imaging apparatus 1, light incident through an optical system 10 and a mechanical shutter 11 is received by an imaging device 12, and is converted to electric signal (imaging signal) by photoelectric conversion. The imaging signal is subjected to signal processing and converted to digital signal (digital imaging signal) by an A/D converter 13. A shutter other than mechanical shutter, such as liquid crystal shutter, may also be used. The digital imaging signal is subjected to processing as described later by a digital clamper 14, an adder/subtractor 15, and a memory 16, then is subjected to a predetermined image processing by a image signal processor 17, and then is recorded to a recording media in a storage processor 18. The recording media may be a non-volatile rewritable memory 21. The image signal processor 17 also provides image data to be displayed on a viewfinder 20 for the purpose of confirming a captured image and the like.

A controller 19 controls the whole of the imaging apparatus 1. For example, the controller 19 includes a CPU (central processing unit), a ROM (read only memory), a RAM (random access memory), and a synchronizing signal generator for generating synchronizing signal used for drive control of the imaging device and timing control (frame-by-frame, pixel-by-pixel, etc.). The CPU controls various components of the imaging apparatus 1 using the RAM as work memory, according to a program stored in the ROM. A UI section 25 includes a release button for starting imaging and several controls for setting various functions of the imaging apparatus 1, such as shutter speed, aperture, zooming, and focusing, and outputs control signals based on the operation performed on these controls to the controller 19.

The optical system 10 includes a lens system, an aperture mechanism, a focusing mechanism, a zooming mechanism and the like, in which aperture, focusing, zooming and the like are controlled based on the control by the controller 19 or based on manual operation. The mechanical shutter 11 can block the light path between the lens system 10 and the imaging device 12, and physically blocks light incident on the imaging device 12. For example, when a user presses down the release button (not shown), the mechanical shutter 11 is controlled to open by the controller 19, and light is incident on the imaging device 11 through the optical system 10. The mechanical shutter 11 is controlled to automatically become closed when a predetermined time elapses from becoming open, for example, according to a preset shutter speed.

The imaging device 12 may be an image sensor employing CMOS (complementary metal-oxide semiconductor) (hereinafter abbreviated as CMOS). The imaging device 12 may also be a CCD (charge coupled device). In the following description, the imaging device 12 is assumed to be a CMOS. As is generally known, the CMOS can control reading each pixel, and for example, can control reading pixel signals for each line. In the CMOS, extracted charges are read, then the charges are reset. Both a rolling shutter and a global shutter can be used for the imaging device 12.

In using the rolling shutter, exposure is started after reset for each line, and when exposure time ends, one line of pixel signals are output. Accordingly, exposure time for each line is shifted by one line between two consecutive lines. In using the global shutter, reset is performed in all lines at the same time, and exposure is started in all lines at the same time. Then reading signal charges from photodiodes to charge detectors is performed in the whole imaging area at the same time.

The imaging device 12 outputs imaging signal for each pixel. The imaging signal output from the imaging device 12 is subjected to signal processing, such as noise suppression and gain control, by a signal processor (not shown) and is input to the A/D converter 13. The A/D converter 13 converts the imaging signal that is input as analog signal to digital signal with a quantization bit rate of X for each pixel.

The digital imaging signal output from the A/D converter 13 is provided to the digital clamper 14. The digital clamper 14 digitally clamps the provided digital imaging signal and fixes its black signal level to a predetermined value. As an example, the digital clamper 14 subtracts the average of signals corresponding to several pixels to be used as optical black from signals each corresponding to each pixel of the digital imaging signal obtained by A/D converting the output of the imaging device 12.

The digital imaging signal of which black signal level is fixed by the digital clamper 14 is provided to the adder/subtractor 15. The adder/subtractor 15 includes an adder section 15A and a subtractor section 15B, and performs, using the memory 16, accumulation of the provided digital imaging signals and subtraction between two accumulated data.

For example, as shown in FIG. 3, the memory 16 includes a memory area 16A and a memory area 16B (shown as AREA #1 and AREA #2, respectively, in FIG. 3), each of which can contain at least one frame of digital imaging signal. Each of the memory area 16A and the memory area 16B can be accessed pixel-by-pixel, and in which the number of bits allocated to one pixel is more than the quantization bit rate per pixel of the A/D converter 13. For example, if the A/D converter 13 A/D converts one pixel data with a quantization bit rate of 14 to output, at least 15 bits are allocated to one pixel in the memory areas 16A and 16B. More preferably, much more bits are allocated to one pixel.

FIG. 4 shows an example of configuration of the adder/subtractor 15. In the adder/subtractor 15, the adder section 15A includes an adder 30 and switches 31 and 32. The subtractor section 15B includes a subtractor 33. For example, the word length (the number of bits) of the adder 30 is at least longer than the quantization bit rate for each pixel of the A/D converter 13. The switches 31 and 32 select the memory area 16A or 16B.

As an example, when data accumulation is performed using the memory area 16A, the switches 31 and 32 select output terminals 31A and 32A, respectively. The digital imaging signal provided to the adder/subtractor 15 is provided to one input terminal of the adder 30. On the other hand, data is read from the memory area 16A and provided to the other input terminal of the adder 30 through the switch 32. The adder 30 adds the digital imaging signal input to the one input terminal to the data input to the other input terminal. The result of addition by the adder 30 is overwritten to the memory area 16A through the switch 31. Note that the adder 30 performs addition between two data corresponding to each pixel.

As described above, in the memory 16, the number of bits allocated to one pixel is more than the quantization bit rate for each pixel of the A/D converter 13. This can reduce data clipping due to carry and data rounding error that may occur when the accumulation of digital imaging signals is performed.

In subtraction by the subtractor section 15B, data read from the memory area 16A for each pixel is provided to one input terminal of the subtractor 33. On the other hand, data read from the memory area 16B for each pixel is provided to the other input terminal of the subtractor 33. The subtractor 33 subtracts the data input to the other input terminal from the data input to the one input terminal. The subtractor 33 performs subtraction, for example, between two data corresponding to each pixel.

The digital imaging signal output from the adder/subtractor 15 is provided to the image signal processor 17. For example, the image signal processor 17 converts the provided digital imaging signal to image data in a predetermined format and performs image processing, such as image quality correction, on the image data. The image data output from the image signal processor 17 is provided to the storage processor 18. The storage processor 18 compression-encodes the provided image data using a given compression encoding method such as JPEG (Joint Photographic Experts Group) method, and records the encoded data to a recording media such as the memory 21.

An example of imaging operation in the imaging apparatus 1 configured as the above is described with reference to a timing chart shown in FIG. 5. In this description, it is assumed that the shutter speed is one minute and exposure is performed for three divided exposure times (20 sec each) into which the one minute is divided, during which the release button is pressed down and the mechanical shutter is open.

At time $t_1$, the release button is pressed down and ON (see FIG. 5A). For example, the release button automatically becomes OFF when a period of time corresponding to the shutter speed elapses from becoming ON. At time $t_1$, the mechanical shutter 11 becomes open (see FIG. 5B), the imaging device 12 is irradiated with light from the object through the optical system 10, and the imaging device 12 is exposed in the non-light-shielded condition.

For example, at time $t_1$, when the release button is pressed down, the controller 19 generates a vertical synchronizing signal VD (see FIG. 5C) and provides it to the imaging device 12. In response to the vertical synchronizing signal VD, the imaging device 12 causes charges stored in all pixels to be output at the same time using global shutter function (GSH) and resets charges in all the pixels.

Immediately after time $t_1$, when charges in all the pixels are reset using global shutter function, storing charge is started in each pixel. At time $t_2$, when a predetermined period of time (20 seconds in this example) has elapsed from time $t_1$, the controller 19 generates another vertical synchronizing signal VD and provides it to the imaging device 12.

The vertical synchronizing signal VD at time $t_2$ causes memory content of the memory 16 in the memory areas 16A and 16B to be cleared, because this is the first time for the pixels to be read since pressing down the release button. The timing for clearing the memory should be before the start of data accumulation in the memory 16 at the latest. For example, the memory may be cleared when the release button is pressed down, which is not limited to the first reading of the pixels.

In response to the vertical synchronizing signal VD, the imaging device 12 causes charges stored in the pixels to be read sequentially line-by-line using rolling shutter function (RSH) (see FIG. 5D) and outputs them as imaging signal. In each pixel of which stored charge has been read out, storing charge is started immediately after the readout.

The imaging signal output from the imaging device 12 sequentially line-by-line is A/D converted by the A/D converter 13 to digital imaging signal with a quantization bit rate of X per pixel. Then the digital imaging signal is clamped by the digital clamper 14 and its black signal level is fixed. This clamping by the digital clamper 14 implements the process of subtracting the dark current component "dark" of the imaging device from the imaging signal as described with reference to FIG. 1.

The digital imaging signal clamped by the digital clamper 14 is provided to the adder/subtractor 15 and accumulatively written to the memory 16 (see FIG. 5E). Currently, at time $t_2$, the mechanical shutter 11 is open and the imaging device 12 is exposed to light from the object. That is, at this time, the digital imaging signal corresponds to the above-described non-light-shielded image signal.

For example, referring to FIG. 4, in the adder/subtractor 15, the terminals 31A and 32A are selected by the switches 31 and 32, respectively. The digital imaging signal is provided to one input terminal of the adder 30. On the other hand, data read from the memory area 16A of the memory 16 is provided to the other input terminal of the adder 30. At this time, the memory content of the memory 16 has been cleared since time $t_1$, and value "0" is provided to the other input terminal of the adder 30 for each pixel. The adder 30 performs addition between two data provided to both the input terminals for each pixel. The result of addition is overwritten to the memory area 16A through the switch 31.

Also at time $t_3$ and $t_4$, when the second and third predetermined periods of time have elapsed, respectively, from time $t_2$, as with time $t_2$, the process of reading charges for each pixel line-by-line using rolling shutter function in the imaging device 12, the process of clamping the digital imaging signal output from the imaging device 12 in response to the reading process, and the process of writing the clamped digital imaging signal to the memory area 16A are performed. Writing the digital imaging signal to the memory area 16A is performed, as described above, by adding, by the adder 30, the data read from the memory area 16A and the digital imaging signal clamped and provided to the adder/subtractor 15 for each pixel and overwriting the result of addition to the memory area 16A.

Note that, in the example shown in FIG. 5, at time $t_4$, charges stored in the pixels during the last divided exposure time with the mechanical shutter 11 open are read. Time $t_4$ is, for example, the point at which the mechanical shutter 11 transitions from open to closed.

In this way, through the time-division exposure during which the mechanical shutter 11 is open and the imaging device 12 is irradiated with light from the object, the process of adding the results of subtraction of the dark current component "dark" from the non-light-shielded image signals, as described referring to FIG. 1A and Equation (1), is performed.

When the mechanical shutter 11 transitions open to closed, then the imaging device 12 becomes exposed in the mechanically closed condition, that is, with the imaging device 12 shielded from light. In the example of FIG. 5, the imaging device 12 is shielded from light and exposed for almost the same period of time as that during which the mechanical shutter 11 was open and the imaging device 12 was exposed to light from the object (one minute in this example). Through the exposure in this light-shielded condition, the process of adding the results of subtraction of the dark current component "dark" from the light-shielded image signals, as described referring to FIG. 1B and Equation (2), is performed.

The exposure with the mechanical shutter 11 closed is performed almost similarly to that with the imaging device 12 irradiated with light from the object as described above. At time $t_5$, when a predetermined period of time has elapsed from time $t_4$ at which charges stored in the pixels during the last divided exposure time with the imaging device 12 exposed to light are read, the controller 19 generates a vertical synchronizing signal VD (see FIG. 5C) and provides it to the imaging device 12. In response to the vertical synchronizing signal VD, the imaging device 12 causes charges stored in all the pixels to be output at the same time using global shutter function and starts storing charges in each pixel immediately (see FIG. 5D).

At time $t_6$, when a predetermined period of time (20 seconds in this example) corresponding to the divided exposure time of the exposure for the non-light-shielded image signal has elapsed from time $t_5$, the controller 19 generates another vertical synchronizing signal VD and provides it to the imaging device 12. In response to the vertical synchronizing signal VD, the imaging device 12 causes charges stored in the pixels to be read sequentially line-by-line using rolling shutter function (see FIG. 5D) and outputs them as imaging signal. In each pixel of which stored charge has been read out, storing charge is started immediately after the readout.

The imaging signal output from the imaging device 12 is converted to digital imaging signal with a quantization bit rate of X per pixel by the A/D converter 13. Then the digital imaging signal is clamped by the digital clamper 14 and its black signal level is fixed. The digital imaging signal with the black signal level fixed is provided to the adder/subtractor 15, and accumulatively written to the memory 16 for each pixel, as described above. The digital imaging signal obtained through exposure with the imaging device 12 shielded from light is written to the memory area 16B of the memory 16.

For example, in the adder/subtractor 15, the terminals 31B and 32B are selected by the switches 31 and 32, respectively. The digital imaging signal is provided to one input terminal of the adder 30. On the other hand, data read from the memory area 16B of the memory 16 is provided to the other input terminal of the adder 30. At this time, the memory content of the memory 16 has been cleared since time $t_1$, and value "0" is provided to the other input terminal of the adder 30 for each pixel. The adder 30 performs addition between two data provided to both the input terminals for each pixel. The result of addition is overwritten to the memory area 16B through the switch 31.

Also at time $t_7$ and $t_8$, when the second and third predetermined periods of time have elapsed, respectively, from time $t_6$, as with time $t_6$, the process of reading pixels from the imaging device 12, the process of A/D conversion with a quantization bit rate of X per pixel by the A/D converter 13, the process of clamping by the digital clamper 14, and the process of accumulatively writing the digital imaging signal to the memory area 16B are performed.

When charges stored in the pixels during the last divided exposure time with imaging device 12 shielded from light and exposed are read at time $t_8$, the subtraction between the accumulated non-light-shielded image signal and the accumulated light-shielded image signal is performed based on Equation (3) described above.

For example, data corresponding to each pixel are read from the memory area 16A and 16B, and provided to one terminal and the other terminal of the subtractor 33, respectively. The subtractor 33 subtracts the data provided to the other input terminal from the data provided to the one input terminal to output. This process is performed on all of one frame of pixel data written to the memory area 16A and the memory area 16B. This effectively removes white spots due to a fixed pattern of the imaging device 12 and allows obtaining captured image data in which degradation of dynamic range due to accumulation of the dark current component is reduced.

FIG. 6 is a flowchart showing an example of exposure process in accordance with the embodiment of the invention. Determinations in the flowchart are performed, for example, by the controller 19 according to a given program.

Prior to the process of the flowchart, the shutter speed is set, and how many divided exposure times the exposure time given by the shutter speed is divided into is determined. In step S21 of FIG. 7A, exposure time per image is set to three minutes, five minute or the like at the factory. When performing imaging, a user sets the shutter speed (mechanical shutter speed) to, e.g., 60 minutes (step S22). The number of divided exposure times is determined by the shutter speed divided by the exposure time per image (=60 minutes/3 minutes=20) as shown in step S23. Alternatively, as shown in FIG. 7B, in step S31, the number of divided exposure times is set to, e.g., 20 at the factory. In step S32, when performing imaging, the user sets the shutter speed to, e.g., 60 minutes. In step S33, the exposure time per image is determined by the shutter speed divided by the number of divided exposure times (=60 minutes/20=3 minutes). When performing imaging with a long exposure time, the shutter speed need not be preset. Instead, as shown in step S41 of FIG. 8, one divided exposure time is preset, and exposure is finished when the release button is released.

Returning to the flowchart of FIG. 6, in step S10, the timing of reading charges from the imaging device 12 is waited for. If determined that it is the timing of reading, the controller 19, for example, generates a vertical synchronizing signal VD and provides it to the imaging device 12. In next step S11, it is determined whether or not the charges read from the imaging device 12 at this timing are ones that have been stored through the first exposure since pressing down the release button. For example, the charges read from the imaging device 12 at time $t_2$ of FIG. 5 are determined to be ones that have been stored through the first exposure since pressing down the release button.

In step S11, if determined not to be the ones that have been stored through the first exposure, the process jumps to step S13. On the other hand, if determined to be the ones that have been stored through the first exposure, the process proceeds to step S12, then the memory content of the memory 16 is cleared, and then the process proceeds to step S13. In step S13, it is determined whether the exposure was performed with the imaging device 12 irradiated with light from the object or with the imaging device 12 shielded from light. If determined that the exposure was performed with the imaging device 12 irradiated with light from the object, the process proceeds to step S14. On the other hand, if determined that the exposure was performed with the imaging device 12 shielded from light, the process proceeds to step S15.

In step S14, the non-light-shielded image signal that is digital imaging signal obtained through the exposure performed with the imaging device 12 irradiated with light from the object is provided to the adder/subtractor 15 and accumulatively written to the memory area 16A of the memory 16 as described above. On the other hand, in step S15, the light-shielded image signal that is digital imaging signal obtained through the exposure performed with the imaging device 12 shielded from light is provided to the adder/subtractor 15 and accumulatively written to the memory area 16B of the memory 16 as described above.

When the digital imaging signal has been accumulatively written to the memory area 16A or 16B, the process proceeds to step S16, where it is determined whether or not the predetermined number of times of exposure according to the set number of divided exposure times have been finished. If determined that the predetermined number of times of exposure have not been finished yet, the process returns to step S10 and another timing of reading charges from the imaging device 12 is waited for.

On the other hand, if determined that the predetermined number of times of exposure have been finished in step S16, the process proceeds to step S17. In step S17, in the adder/subtractor 15, according to Equation (3) described above, the process of subtracting the light-shielded image signal accumulatively written to the memory area 16B from the non-light-shielded image signal accumulatively written to the memory area 16A is performed for each pixel. This subtraction process for each pixel is performed on all of one frame of pixel data written to the memory area 16A and the memory area 16B.

The process of setting the divided exposure time at the factory and finishing exposure when the release button is released, as described with reference to FIG. 8, is described with reference to flowcharts shown in FIGS. 9A and 9B.

First, the process in the non-light-shielded condition is performed as shown in the flowchart of FIG. 9A. In FIG. 9A, the process steps corresponding to the steps S10, S11, S12, and S14 in FIG. 6 are shown as steps S110, 5111, 5112, and 5114, respectively.

In the first step S101, the count value CNT1, which means the number of performing exposure for one divided exposure time, is initialized to 0. Then exposure in the non-light-shielded condition is performed similarly to the process shown in the flowchart of FIG. 6. In step S102, the count value CNT1 is incremented and stored every time exposure is performed for one divided exposure time. Then, if determined in step S103 that the release button is released, the addition of non-light-shielded image signals is performed in the memory area #1 in step S104.

Next, the process in the light-shielded condition is performed as shown in the flowchart of FIG. 9B. In FIG. 9B, the process steps corresponding to the steps S10, S11, S12, and S15 in FIG. 6 are shown as steps S210, 5211, S212, and S215, respectively. In the first step S201, the count value CNT2, which means the number of performing exposure for one divided exposure time, is initialized to 0. In step S202, the count value CNT2 is incremented and stored every time exposure is performed for one divided exposure time. Then, if determined in step S203 that CNT1 equals CNT2, the addition result of light-shielded image signals stored in the memory area #2 is subtracted from the addition result of non-light-shielded image signals stored in the memory area #1 in step S217.

An example of an advantage of the above-described control in accordance with the embodiment of the invention is described with reference to FIGS. 10 to 12. An example of an advantage of subtracting the dark current component "dark" every time exposure is performed for one divided exposure time and accumulating the digital imaging signals is described with reference to FIG. 10. Note that, in the following description, the object signal component is assumed to be signal component that is captured image signal based on the output of the imaging device 12 from which noise component due to a fixed pattern of the imaging device 12 and the dark current component "dark" are removed.

When long exposure is performed, the object signal component as well as the dark current component are accumulated to increase as exposure time increases. As a result, as shown in FIG. 10A, the non-light-shielded image signal component that is the sum of the object signal component and the dark current component reaches X bits that is the maximum output signal level of the A/D converter at exposure time et, and the level of the non-light-shielded image signal component is saturated and clipped at exposure time et or later. Consequently, the dynamic range of the object signal is significantly reduced at exposure time et or later.

In this embodiment, in long exposure, exposure time is divided and time-division exposure is performed, and also, the dark current component is subtracted from the object signal component every time exposure for one divided exposure time is performed. Accordingly, the dark current component "dark" is removed before the non-light-shielded image signal component reaches the maximum output signal level of the A/D converter, only the object signal component can be accumulated as the non-light-shielded image signal, and the dynamic range can be ensured as illustrated in FIG. 10B.

An example of an advantage of subtracting the light-shielded image signal obtained through exposure with the imaging device 12 shielded from light, from the non-light-shielded image signal obtained through exposure with the imaging device 12 irradiated with light from the object, is described with reference to FIG. 11. The non-light-shielded image signal is a composite signal of the object signal component based on light from the object and the noise component based on a fixed pattern of the imaging device 12. When long exposure is performed, the object signal component as well as the noise component based on the fixed pattern are accumulated to increase as exposure time increases. As a result, as illustrated in FIG. 11A, the dynamic range of the object signal component will be compressed by the accumulated noise component.

In this embodiment, first, the non-light-shielded image signal is obtained through exposure with the mechanical shutter 11 open, then the light-shielded image signal is obtained through exposure with the mechanical shutter 11 closed for almost the same exposure time as with the non-light-shielded image signal. The light-shielded image signal is only the accumulated noise component based on the fixed pattern of the imaging device 12. Thus subtracting the light-shielded image signal component from the non-light-shielded image signal component after obtaining the light-shielded image signal through exposure allows obtaining only the object signal component as the non-light-shielded image signal as illustrated in FIG. 11B and ensuring the dynamic range of the object signal component.

An example of an advantage of allocating the number of bits to one pixel in the memory 16 used for accumulating the digital imaging signal being more than the quantization bit rate for one pixel of the A/D converter 13, is described with reference to FIG. 12. Note that, in FIGS. 12A and 12B, the line representing the non-light-shielded image signal component represents values in the memory area 16A, and the line representing the defect component represents values in the memory area 16B. The difference between the non-light-shielded image signal component in the memory area 16A and the defect component in the memory area 16B is the object signal component based on light from the object.

First, consider that the number of bits allocated to one pixel in the memory 16 is the same as the quantization bit rate (X bits) for one pixel of the A/D converter 13. In this case, as illustrated in FIG. 12A, the non-light-shielded image signal component accumulatively increases as exposure time increases, then in the memory area 16A, the accumulated non-light-shielded image signal component may be saturated, for example, at the data length of X bits at exposure time et, and the accumulated component of X bits or higher may be clipped at exposure time et or later. Then, at exposure time et or later, the dynamic range of the object signal component that is the result of subtracting the accumulated defect component from the accumulated non-light-shielded image signal component may be significantly reduced.

In this embodiment of the invention, the number of bits (Y bits) allocated to one pixel in the memory 16 is more than the quantization bit rate for one pixel of the A/D converter 13. As illustrated in FIG. 12B, this prevents the accumulated non-light-shielded image signal component from being saturated in the memory area 16A and ensures the dynamic range of the object signal component, even when long exposure is performed (see FIG. 12C).

The invention claimed is:
1. An imaging apparatus, comprising:
an imaging device having a plurality of pixels, storing charge generated by photoelectric conversion in each of the plurality of pixels, and outputting an imaging signal including pixel data based on the charge stored in each of the plurality of pixels;
a first and second memory that store the imaging signal;
an adder that adds the imaging signal for each pixel data;
a controller that, in a non-light-shielded condition, controls the imaging device to output the imaging signal for every divided exposure time into which exposure time is divided by a number of division times, and accumulates, for each pixel data, the imaging signal for each divided exposure time and stores the accumulated imaging signal in the first memory, and that, in a light-shielded condition, controls the imaging device to output the imaging signal for every divided exposure time into which the exposure time is divided by the number of division times, and accumulates, for each pixel data, the imaging signal for each divided exposure time and stores the accumulated imaging signal in the second memory; and
a subtractor that subtracts each pixel data of the imaging signal that is accumulated and stored in the second memory from each pixel data of the imaging signal that is accumulated and stored in the first memory one time, after accumulation during each of the number of division times has been performed,
wherein a number of bits allocated to at least one of each pixel data in the first memory and each pixel data in the second memory is greater than a number of quantization bits used for analog-to-digital (A/D) conversion.
2. The imaging apparatus according to claim 1, further comprising:
an A/D converter that converts an analog format of the imaging signal and outputs a digital imaging signal; and
a digital clamper that removes a dark current component of the imaging device from the digital imaging signal.

3. The imaging apparatus according to claim 2,
wherein a second word length allocated to one pixel stored in the second memory is longer than a first word length allocated to one pixel of the digital imaging signal.

4. The imaging apparatus according to claim 1, wherein a number of bits used for an addition operation performed by an adder is greater than the number of quantization bits used for A/D conversion, and wherein the adder either adds together non-light-shielded image signals or adds together light-shielded image signals.

5. An imaging control method for performing imaging using an imaging device having a plurality of pixels, storing charge generated by photoelectric conversion in each of the plurality of pixels, and outputting an imaging signal including pixel data based on the charge stored in each pixel, the method comprising:

performing imaging by the imaging device to output the imaging signal;

outputting, in a non-light-shielded condition, by the imaging device, the imaging signal as a non-light-shielded image signal for every divided exposure time into which exposure time is divided by a number of division times;

accumulating, for each pixel data, the non-light-shielded image signal for each divided exposure time;

outputting, in a light-shielded condition, by the imaging device, the imaging signal as a light-shielded image signal for every divided exposure time into which the exposure time is divided by the number of division times;

accumulating, for each pixel data, the light-shielded image signal for each divided exposure time; and subtracting each pixel data of the imaging signal that is accumulated the number of division times in the non-light-shielded condition from each pixel data of the imaging signal that is accumulated the number of division times in the light-shielded condition, wherein a number of bits allocated to at least one of each pixel data of the imaging signal that is accumulated for the non-light-shielded condition and each pixel data of the imaging signal that is accumulated for the light-shielded condition is greater than a number of quantization bits used for analog-to-digital (A/D) conversion.

6. The imaging control method according to claim 5, wherein a number of bits used for an addition operation performed by an adder is greater than the number of quantization bits used for A/D conversion, and wherein the adder either adds together non-light-shielded image signals or adds together light-shielded image signals.

7. A non-transitory computer-readable storage medium having computer readable program codes embodied in the computer readable storage medium for performing imaging using an imaging device having a plurality of pixels, storing charge generated by photoelectric conversion in each pixel, and outputting imaging signal including pixel data based on charge stored in each pixel, the computer readable program codes that, when executed cause an imaging apparatus to execute:

performing imaging by the imaging device to output the imaging signal;

outputting, in a non-light-shielded condition, by the imaging device, the imaging signal as a non-light-shielded image signal for every divided exposure time into which exposure time is divided by a number of division times;

accumulating, for each pixel data, the non-light-shielded image signal for each divided exposure time;

outputting, in a light-shielded condition, by the imaging device, the imaging signal as a light-shielded image signal for every divided exposure time into which the exposure time is divided by the number of division times;

accumulating, for each pixel data, the light-shielded image signal for each divided exposure time; and subtracting each pixel data of the imaging signal that is accumulated the number of division times in the non-light-shielded condition from each pixel data of the imaging signal that is accumulated the number of division times in the light-shielded condition, wherein a number of bits allocated to at least one of each pixel data of the imaging signal that is accumulated for the non-light-shielded condition and each pixel data of the imaging signal that is accumulated for the light-shielded condition is greater than a number of quantization bits used for analog-to-digital (A/D) conversion.

8. The non-transitory computer-readable storage medium according to claim 7, wherein a number of bits used for an addition operation performed by an adder is greater than the number of quantization bits used for A/D conversion, and wherein the adder either adds together non-light-shielded image signals or adds together light-shielded image signals.

* * * * *